(12) United States Patent
Wildes et al.

(10) Patent No.: US 8,844,215 B2
(45) Date of Patent: Sep. 30, 2014

(54) SUPPORT ASSEMBLY FOR SUPPORTING PHOTOVOLTAIC MODULES

(71) Applicant: Ecolibrium Solar, Inc., Athens, OH (US)

(72) Inventors: Brian James Wildes, Athens, OH (US); James Joseph Huth, Athens, OH (US)

(73) Assignee: Ecolibrium Solar, Inc., Athens, OH (US)

( * ) Notice: Subject to any disclaimer, the term of this patent is extended or adjusted under 35 U.S.C. 154(b) by 0 days.

(21) Appl. No.: 13/923,342

(22) Filed: Jun. 20, 2013

(65) Prior Publication Data
US 2014/0014158 A1 Jan. 16, 2014

Related U.S. Application Data

(60) Provisional application No. 61/690,974, filed on Jul. 10, 2012.

(51) Int. Cl.
| | |
|---|---|
| *E04D 13/18* | (2014.01) |
| *H01L 31/042* | (2014.01) |
| *H01L 31/048* | (2014.01) |

(52) U.S. Cl.
CPC ........ *H01L 31/0422* (2013.01); *H01L 31/0485* (2013.01); *Y02E 10/50* (2013.01)
USPC ..................................................... 52/173.3

(58) Field of Classification Search
USPC .......... 52/173.3; 126/621, 622, 623; 136/244, 136/246, 251, 259; 248/237
See application file for complete search history.

(56) References Cited

U.S. PATENT DOCUMENTS

| | | | |
|---|---|---|---|
| 4,677,248 | A | 6/1987 | Lacey |
| 5,092,939 | A | 3/1992 | Nath et al. |
| 5,746,839 | A | 5/1998 | Dinwoodie |
| 6,105,316 | A | 8/2000 | Bottger et al. |

(Continued)

FOREIGN PATENT DOCUMENTS

| | | |
|---|---|---|
| JP | 07018795 A | 1/1995 |
| JP | 09177272 A | 7/1997 |

(Continued)

OTHER PUBLICATIONS

PCT Form 210, International Search Report for PCT/US2012/060032, mailed on Mar. 18, 2013.

(Continued)

*Primary Examiner* — Mark Wendell
(74) *Attorney, Agent, or Firm* — The Law Office of Patrick F. O'Reilly III, LLC

(57) ABSTRACT

A support assembly for supporting one or more photovoltaic modules on a support surface is disclosed herein. The support assembly includes (i) a body portion, the body portion including a base portion for accommodating one or more ballasts, the body portion comprising polymer; and (ii) integrated grounding means, the integrated ground means configured to provide integrated grounding between adjacent photovoltaic modules. The support assembly is configured to bridge multiple rows of photovoltaic modules without being directly secured to any other support assembly. Thus the support assembly can be utilized to support a wide variety of different sizes of photovoltaic modules. A mounting system for supporting a plurality of photovoltaic modules on a support surface, which comprises a plurality of separate support assemblies, is also disclosed herein.

21 Claims, 16 Drawing Sheets

(56) References Cited

U.S. PATENT DOCUMENTS

| | | | |
|---|---|---|---|
| 6,331,671 | B1 | 12/2001 | Makita et al. |
| 6,360,491 | B1 | 3/2002 | Ullman |
| 6,672,018 | B2 | 1/2004 | Shingleton |
| D510,315 | S | 10/2005 | Shugar et al. |
| 6,959,517 | B2 | 11/2005 | Poddany et al. |
| D519,444 | S | 4/2006 | Mascolo |
| D547,262 | S | 7/2007 | Ullman |
| D560,605 | S | 1/2008 | McClintock et al. |
| D564,958 | S | 3/2008 | Almy et al. |
| D565,505 | S | 4/2008 | Shugar et al. |
| 7,435,134 | B2 * | 10/2008 | Lenox ............................ 439/567 |
| 7,476,832 | B2 | 1/2009 | Vendig et al. |
| D586,737 | S | 2/2009 | Shugar et al. |
| 7,492,120 | B2 | 2/2009 | Benn et al. |
| D598,372 | S | 8/2009 | Sasada |
| 7,780,472 | B2 * | 8/2010 | Lenox ............................ 439/567 |
| 8,136,311 | B2 * | 3/2012 | Liu ............................... 52/173.3 |
| 8,191,320 | B2 * | 6/2012 | Mittan et al. .................. 52/173.3 |
| 8,266,848 | B2 * | 9/2012 | Miros et al. ................... 52/173.3 |
| 8,276,330 | B2 * | 10/2012 | Harberts et al. .............. 52/173.3 |
| 8,397,448 | B2 * | 3/2013 | Brown et al. ................. 52/173.3 |
| 8,424,255 | B2 * | 4/2013 | Lenox et al. .................. 52/173.3 |
| 8,505,864 | B1 * | 8/2013 | Taylor et al. .................. 248/237 |
| D692,372 | S | 10/2013 | Rothschild et al. |
| 2005/0072456 | A1 | 4/2005 | Stevenson et al. |
| 2005/0166955 | A1 | 8/2005 | Nath et al. |
| 2007/0095388 | A1 | 5/2007 | Mergola et al. |
| 2007/0144575 | A1 | 6/2007 | Mascolo et al. |
| 2009/0019796 | A1 * | 1/2009 | Liebendorfer ................ 52/173.3 |
| 2009/0134291 | A1 | 5/2009 | Meier et al. |
| 2009/0242014 | A1 * | 10/2009 | Leary ............................ 136/251 |
| 2009/0320904 | A1 | 12/2009 | Botkin et al. |
| 2009/0320905 | A1 | 12/2009 | Botkin et al. |
| 2009/0320906 | A1 | 12/2009 | Botkin et al. |
| 2009/0320907 | A1 | 12/2009 | Botkin et al. |
| 2010/0154780 | A1 | 6/2010 | Linke |
| 2010/0212714 | A1 * | 8/2010 | Rothschild et al. ........... 136/244 |
| 2010/0219304 | A1 | 9/2010 | Miros et al. |
| 2010/0269428 | A1 | 10/2010 | Stancel et al. |
| 2011/0056536 | A1 | 3/2011 | Meppelink et al. |
| 2011/0179727 | A1 * | 7/2011 | Liu ............................... 52/173.3 |
| 2011/0278411 | A1 * | 11/2011 | Carbonare et al. ............ 248/237 |
| 2012/0031473 | A1 | 2/2012 | Chan et al. |
| 2012/0032045 | A1 * | 2/2012 | Lallier et al. .................. 248/237 |
| 2012/0266944 | A1 | 10/2012 | Wildes |
| 2013/0032208 | A1 | 2/2013 | Walz et al. |

FOREIGN PATENT DOCUMENTS

| | | |
|---|---|---|
| JP | 2008214875 A | 9/2008 |
| WO | 2005020290 A2 | 3/2005 |
| WO | 2009120923 A2 | 10/2009 |

OTHER PUBLICATIONS

PCT Form 237, Written Opinion of the International Searching Authority for PCT/US2012/060032, mailed on Mar. 18, 2013.

First office action on the merits (Non-Final Rejection) in U.S. Appl. No. 13/273,525, sent on Mar. 21, 2013.

Notice of Allowance in U.S. Appl. No. 13/273,525, mailed on Sep. 12, 2013.

First office action on the merits (Non-Final Rejection) in U.S. Appl. No. 13/923,303, mailed on Sep. 20, 2013.

PCT Form 210, International Search Report for PCT/US2013/049851, mailed on Nov. 7, 2013.

PCT Form 237, Written Opinion of the International Searching Authority for PCT/US2013/049851, mailed on Nov. 7, 2013.

Supplemental Notice of Allowance in U.S. Appl. No. 13/273,525, mailed on Dec. 11, 2013.

\* cited by examiner

SUPPORT ASSEMBLY FOR SUPPORTING PHOTOVOLTAIC MODULES

CROSS-REFERENCE TO RELATED APPLICATIONS

This patent application claims priority to, and incorporates by reference in its entirety, U.S. Provisional Patent Application No. 61/690,974, entitled "Modular Solar Mounting System Made With Polymers and Providing Integrated Grounding", filed on Jul. 10, 2012.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO APPENDIX

Not Applicable.

FIELD OF THE INVENTION

The field of the present invention generally relates to mounting systems and methods and, more particularly, to support assemblies and mounting systems for mounting photovoltaic modules or panels on support surfaces such as, for example, building rooftops, the ground, or the like.

BACKGROUND OF THE INVENTION

A photovoltaic (PV) panel, often referred to as a solar panel or PV module, is a packaged interconnected assembly of solar cells also known as PV cells. The PV module is typically used as a component of a larger PV system to generate and supply electricity in commercial and residential applications. Because a single PV module can only produce a limited amount of power, most installations contain several PV modules to form a PV array. The PV array is often mounted on a building rooftop or the ground with each of the PV modules in a fixed position facing generally south.

There are many mounting systems for securing PV modules to rooftops that adequately withstand wind loads. However, these prior mounting systems are not environmentally friendly, are relatively expensive to produce, time consuming to install, custom fabricated to each type or brand of PV module, and/or can damage the rooftop by penetrating a roof membrane. Accordingly, there is a need in the art for improved mounting systems for PV modules in rooftop applications, and improved support assemblies for supporting PV modules on rooftops.

SUMMARY OF THE INVENTION

Disclosed are support assemblies and mounting systems using the same that overcome at least one of the disadvantages of the related art described above. Disclosed is a support assembly for supporting one or more photovoltaic modules on a support surface, which includes: a body portion, the body portion including a base portion for accommodating one or more ballasts, the body portion comprising polymer; and integrated grounding means, the integrated grounding means configured to provide integrated grounding between adjacent photovoltaic modules. The support assembly is configured to bridge multiple rows of photovoltaic modules without being directly secured to any other support assembly. The support assembly is structurally configured to accommodate photovoltaic modules in both a portrait orientation and a landscape orientation.

Also disclosed is a support assembly for supporting one or more photovoltaic modules on a support surface, which includes: a body portion, the body portion including a base portion for accommodating one or more ballasts, the body portion comprising polymer; integrated grounding means, the integrated grounding means configured to provide integrated grounding between adjacent photovoltaic modules; and at least one clamp subassembly, the at least one clamp subassembly coupled to the body portion, the at least one clamp subassembly configured to be coupled to one or more photovoltaic modules. The support assembly is configured to bridge multiple rows of photovoltaic modules without being directly secured to any other support assembly. The support assembly is structurally configured to accommodate photovoltaic modules in both a portrait orientation and a landscape orientation.

Also disclosed is a mounting system for supporting a plurality of photovoltaic modules on a support surface, which includes: a plurality of photovoltaic modules disposed in an array, the array including a plurality of rows of the photovoltaic modules; and a plurality of separate support assemblies supporting and orienting the photovoltaic modules in the array. Each of the plurality of support assemblies including: a body portion, the body portion including a base portion for accommodating one or more ballasts, the body portion comprising polymer; and integrated grounding means, the integrated grounding means configured to provide integrated grounding between adjacent photovoltaic modules. One or more of the plurality of support assemblies are configured to bridge two of the plurality of rows of the photovoltaic modules without being directly secured to any other of the plurality of support assemblies. One or more of the support assemblies are structurally configured to accommodate photovoltaic modules in both a portrait orientation and a landscape orientation.

From the foregoing disclosure and the following more detailed description of various preferred embodiments it will be apparent to those skilled in the art that the present invention provides a significant advance in the technology and art of mounting systems. Particularly significant in this regard is the potential the invention affords for a device that is universal, environmentally friendly, relatively inexpensive to produce and is easy to use. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
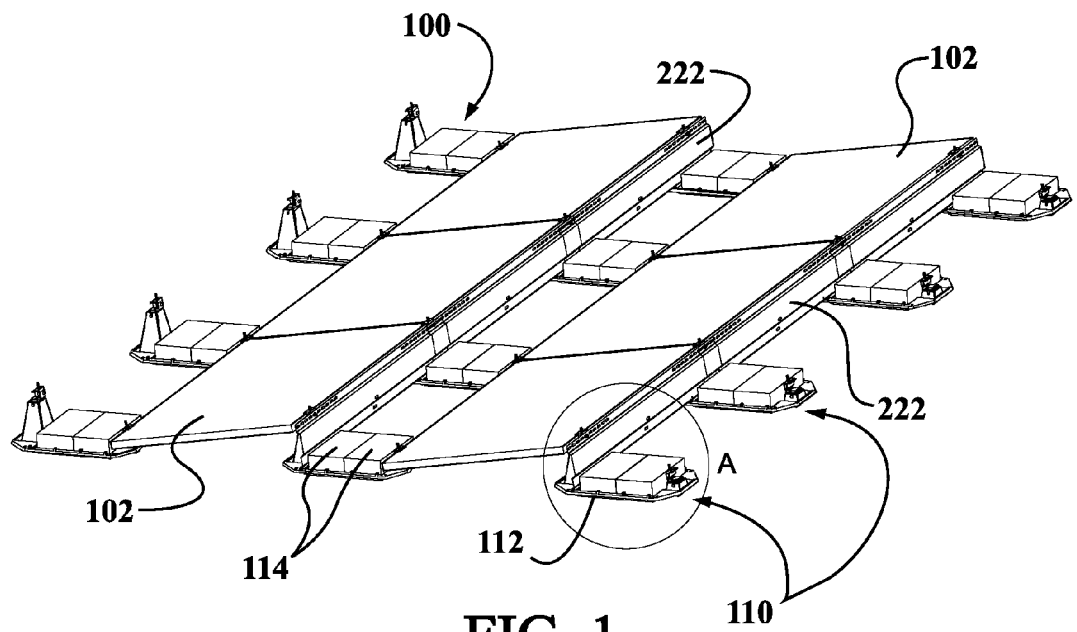
FIG. 1 is a perspective view of an array according to an embodiment of the present invention.

It should be understood that the appended drawings are not necessarily to scale, presenting a somewhat simplified representation of various preferred features illustrative of the basic principles of the invention. The specific design features of the mounting systems as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the mounting systems illustrated in the drawings. In general, up or upward refers to an upward direction within the plane of the paper in FIG. 7 and down or downward refers to a downward direction within the plane of the paper in FIG. 7. In general, front or forward refers to a direction towards the south and towards the left within the plane of the paper in FIG. 1 and rear or rearward refers to a direction towards the north and towards the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved mounting systems and methods disclosed herein. The following detailed discussion of various alternative and preferred embodiments will illustrate the general principles of the invention with regard to the specific application of rooftop mounted photovoltaic (PV) modules that are in the form of rectangular-shaped panels. Other embodiments suitable for other applications will be apparent to those skilled in the art given the benefit of this disclosure such as for example, ground mounted PV modules and/or PV modules having different shapes.

Figure 2:
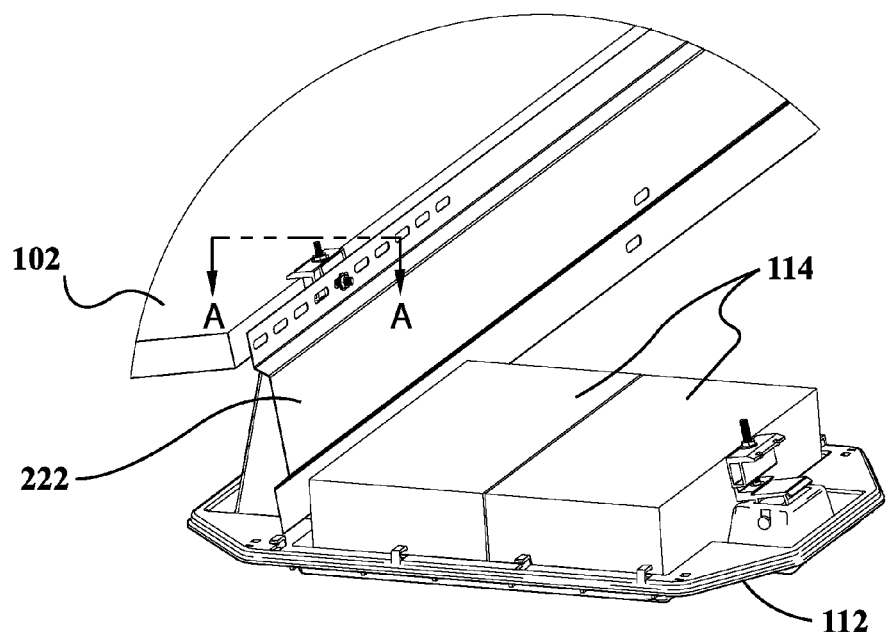
FIG. 2 is an enlarged perspective view of an encircled portion of FIG. 1 (Detail A), showing a support assembly of the mounting system.
Figure 3:
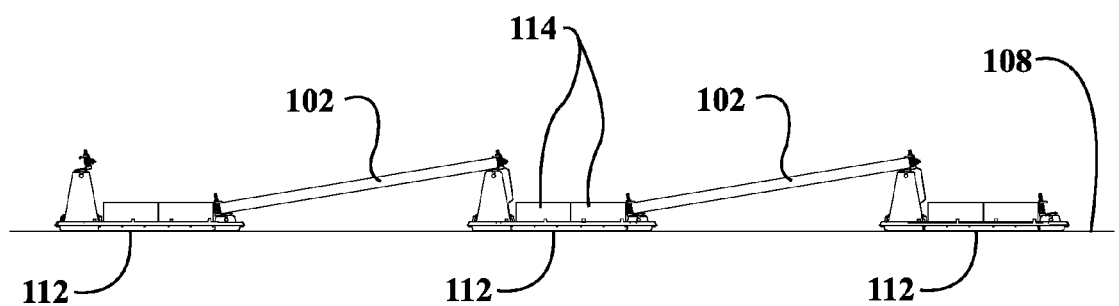
FIG. 3 is a side elevational view of the array of FIG. 1.

FIGS. 1-3 illustrate a photovoltaic system or array 100 according to an embodiment of the present invention. The illustrated photovoltaic system or array 100 includes an array of solar panels or PV modules 102 mounted to a substantially flat support surface 108 (see FIG. 3) in the form of a building rooftop 108 by a mounting system or assembly 110. In FIG. 1, there are two rows of PV modules 102 illustrated for exemplary purposes, each of the two rows having three (3) PV modules 102 disposed therein. The illustrated mounting system 110 includes a plurality of support assemblies 112 (or support assembly members 112) that rest on the support surface 108 and support and orient the PV modules 102 above the support surface 108 and a plurality of ballasts 114 in the form of ballast blocks that weight the support assemblies 112 to the support surface 108 to maintain the position of the support assemblies 112 on the support surface 108. As shown in FIG. 1, the four (4) support assemblies 112 disposed in the middle of the PV array 100 bridge the two rows of PV modules 102. The PV array 100 illustrated in FIGS. 1-3 has each of the rectangular shaped PV modules 102 oriented in a landscape orientation, that is, with the longest axis of the PV modules 102 extending in a lateral or side-to-side direction which is typically the east-west direction. It is noted, however, that the PV modules 102 can alternatively be oriented by the support assemblies 112 in a portrait orientation, that is, with the longest axis of the PV modules 102 extending in a forward-rearward direction which is typically the south-north direction (see FIG. 11). In either the landscape or portrait orientations, the illustrated PV modules 102 are supported in an inclined position such that the forward end of each PV module 102 is positioned lower than its rearward end so that typically the southern end is positioned lower than the northern end.

Figure 11:
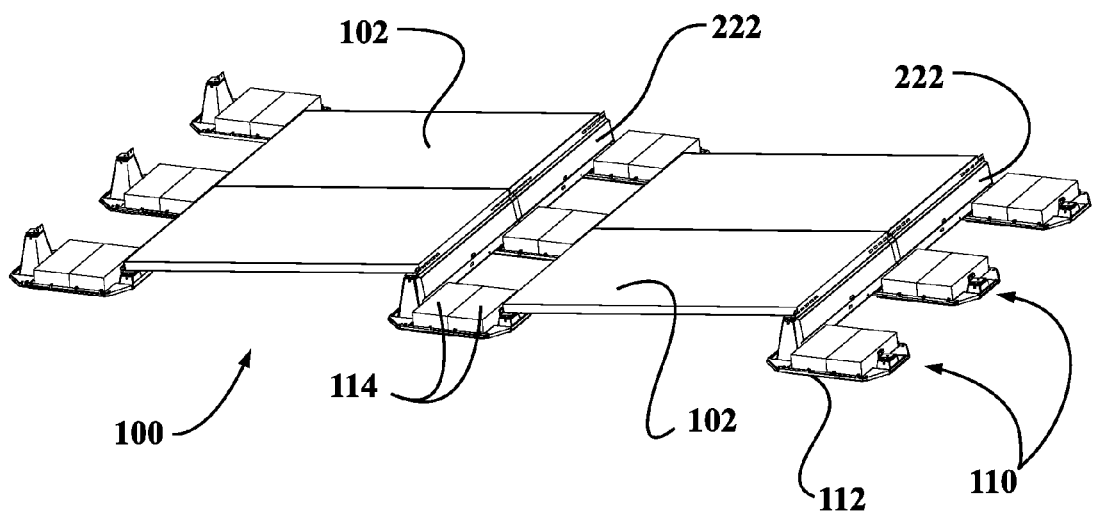
FIG. 11 is another perspective view of an alternative version of the array of PV modules shown in FIG. 1 but wherein the PV modules are secured in a different orientation.

As shown in the perspective views of FIGS. 1 and 11, each illustrated PV module 102 is supported by a plurality of the support assemblies 112. At least three of the support assemblies 112 must be utilized for each of the PV modules 102 in order to establish a desired plane for the PV modules 102. For the illustrated rectangular-shaped PV modules 102, at least four of the support assemblies 112 are preferably utilized to support each of the PV modules 102 so that they can be positioned at or near each corner of the rectangular-shaped PV modules 102. Each support assembly 112 supports at least one of the PV modules 102 but some of the illustrated support assemblies 112 support more than one of the PV modules 102. The illustrated PV modules 102 are secured to the support assemblies 112 (as described in more detail hereinafter) but each of the support assemblies 112 is not directly secured to any of the other support assemblies 112 (e.g., there is no rail member connecting one support assembly to another support assembly). It is noted that while there is not a direct structural connection between the support assemblies 112, the support assemblies 112 are indirectly connected by the PV modules 102 in a structural manner (i.e., they are connected in a load carrying manner). Also, it is further noted that non-load bearing components, such as wind shields (or wind deflectors), wire trays, and the like can also be supported by the support assemblies 112 as described in more detail hereinafter. Thus, the support assemblies 112 are only structurally connected to one another through the PV modules 102. Securing the support assemblies 112 at or near the corners of PV modules 102, and not directly connecting them to one another, allows the mounting system 110 to be used with PV modules 102 of any width and length without requiring customization or modification to the support assemblies 112 or the PV modules 102. Thus, a common support assembly 112 can be used in many applications to mount many different models of PV modules 102. Also, the illustrated support assemblies 112 are not fastened to the support surface 108 and simply rest on the support surface 108 as they are weighted in place by the ballasts 114. Therefore, the support assemblies 112 do not penetrate the roof membrane of the support surface 108, nor do they require fasteners that penetrate the roof membrane of the support surface 108. That is, the support assembly 112 is in the form of a non-penetrating support device that does not penetrate the support surface 108.

With the exception of the clamping assembly components, the support assembly 112 can be formed entirely of polymer or plastic. That is, the body portion of the support assembly 112 (see FIGS. 5-9), which includes the base portion 116, the first upright support member 120, and the second upright support member 134 can be formed entirely of polymer or plastic, and components 116, 120, 134 can all be molded as an integral unit from a polymer or plastic. One suitable polymer or plastic for the body of the support assembly 112 is acrylonitrile styrene acrylate (ASA) Luran® by Styrolution. The use of a highly durable plastic, such as Luran®, ensures that the support assembly 112 will be able to withstand the toughest rooftop exposure for twenty-five (25) years or more (i.e., the support assembly 112 has substantial weatherability). Advantageously, plastic is harmless on the roof membrane, it is non-corrosive, it is non-conductive (i.e., it does not pose any electrical potential threat), and it has a low cost.

Now, with particular reference to FIGS. 4-9, the structural features of the illustrated support assembly 112 will be described in detail. As best shown in the perspective views of FIGS. 4 and 5, the support assembly 112 generally comprises a base portion 116, the base portion 116 including a recessed portion 118 for accommodating one or more ballasts 114; a first upright support member 120 coupled to the base portion 116, the first upright support member 120 having a top surface 128, the top surface 128 being disposed at a first elevation E1 relative to the base portion 116 of the support assembly 112 (i.e., relative to the bottom surface of the base portion 116—see FIG. 9); and a second upright support member 134 coupled to the base portion 116, the second upright support member 134 spaced apart from the first upright support member 120 across the recessed portion 118 of the base portion 116, the second upright support member 134 having a top surface 142, the top surface 142 being disposed at a second elevation E2 relative to the base portion 116 of the support assembly 112 (i.e., relative to the bottom surface of the base portion 116—see FIG. 9). As shown in the side view of FIG. 9, the first elevation E1 of the top surface 128 is higher than the second elevation E2 of the top surface 142. Also, as illustrated in FIGS. 4 and 5, each of the first and second upright support members 120, 134 is provided with a respective peripheral recess 132, 146 therearound.

Figure 4:
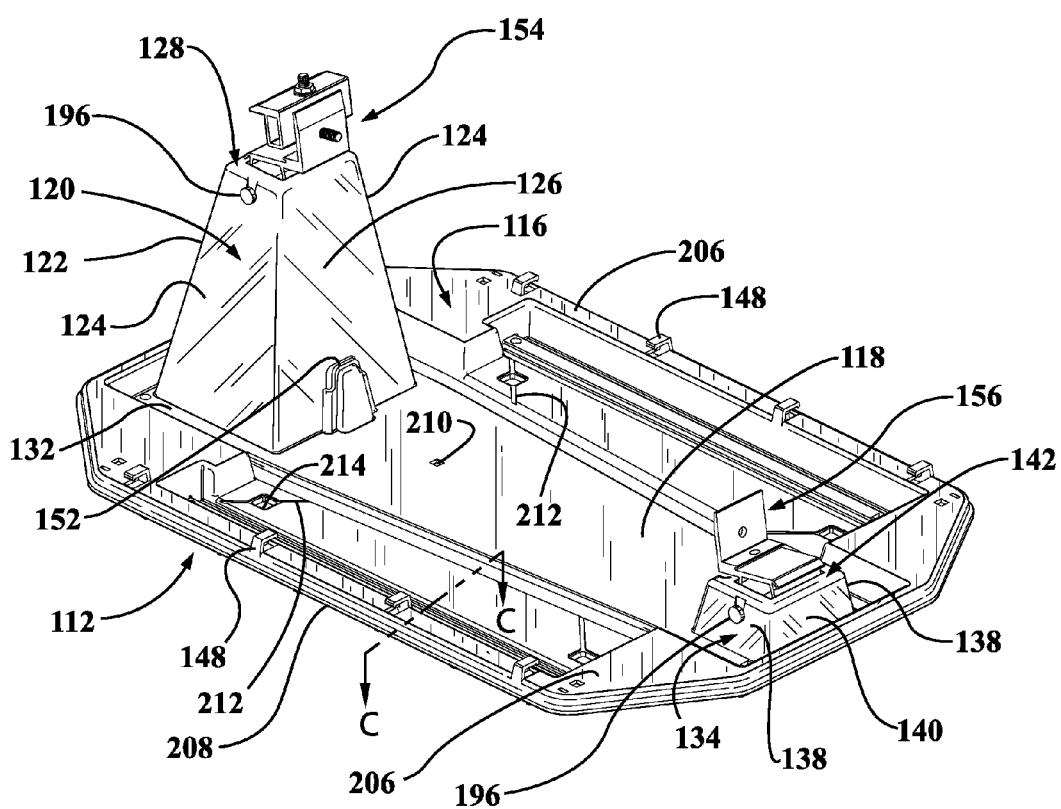
FIG. 4 is a top/rear perspective view of one of the support assemblies of FIGS. 1-3.
Figure 5:
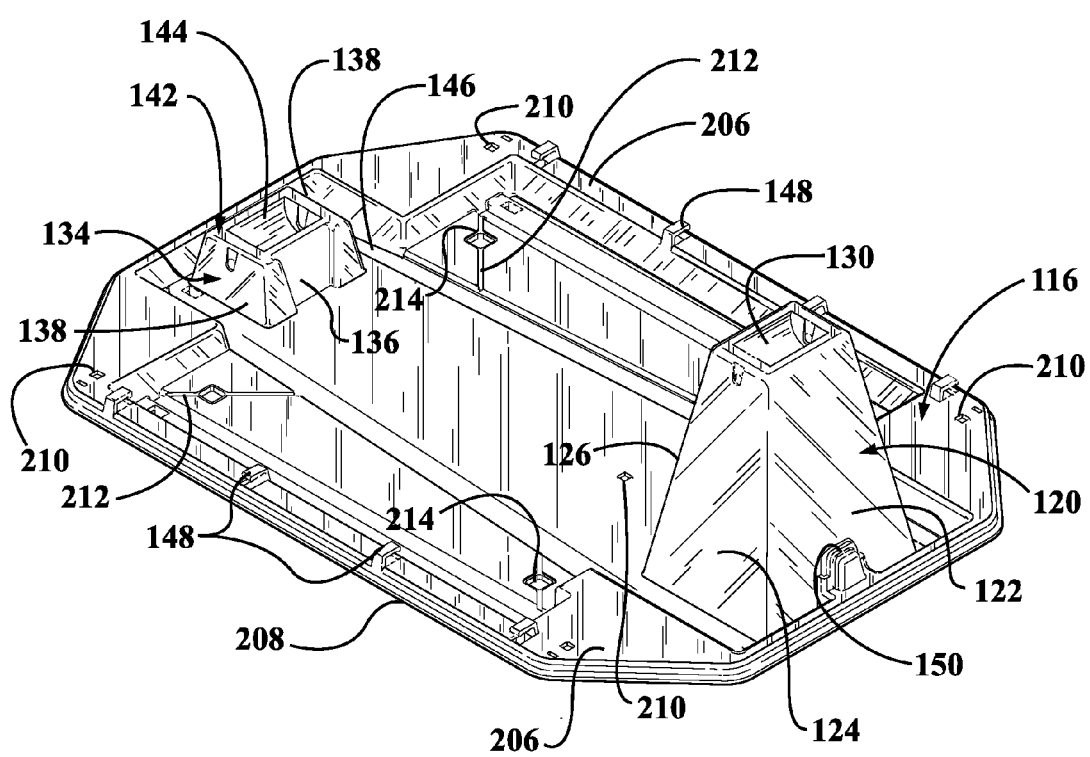
FIG. 5 is a top/front perspective view of the support assembly of FIG. 4, wherein the rotatable clamp subassemblies have been removed from the first and second upright support members so that certain features of the body portion of the support assembly can be more clearly illustrated.

As shown in the top perspective views of FIGS. 4 and 5, the base portion 116 of the support assembly 112 is provided with a peripheral ledge 206 around the periphery thereof. The peripheral ledge 206 of the base portion 116 circumscribes the recessed portion 118 of the support assembly, as well as the first and second upright support members 120, 134. At the outermost edge of the peripheral ledge 206, the base portion 116 is provided with a downturned peripheral edge 208 that circumscribes the entire support assembly 112 (see e.g., FIGS. 4 and 19). Now, turning to the bottom perspective view of FIG. 6, it can be seen that each opposed side portion of the peripheral ledge 206 is provided with a plurality of longitudinally spaced apart reinforcement ribs 220 disposed thereunder. The reinforcement ribs 220 structurally support the opposed side portions of the peripheral ledge 206, and more generally, add structural rigidity to the support assembly as a whole.

The recessed portions 118 of the base portions 116 of the support assemblies 112 are designed to accommodate a plurality of ballasts 114 (e.g., two (2) ballasts 114 arranged side-by-side as illustrated in FIGS. 1 and 2). In an exemplary embodiment, the ballast blocks 114 are of the size 4"×8"×16" and weigh about 31.5 pounds each based on ASTM Designation C1491-01a.

The generally hollow shape and large draft angles of the plastic body portion of the support assemblies 112 (i.e., the plastic body portion comprising the base portion 116, the first upright support member 120, and the second upright support member 134) allow for the illustrated support assemblies 112 to be nested together when stacked to lower shipping and handling costs.

With continued reference to FIGS. 4-9, it can be seen that the first upright support member 120 comprises a front wall 122, opposed side walls 124, and a rear wall 126. Each of these walls 122, 124, 126 is sloped inwardly in an upward direction such that the first upright support member 120 has a generally truncated pyramidal shape. Similarly, the second upright support member 134 comprises a front wall 136, opposed side walls 138, and a rear wall 140. Like the walls 122, 124, 126 of the first upright support member 120, the walls 136, 138, 140 of the second upright support member 134 are also sloped inwardly so as to also give the second upright support member 134 a generally truncated pyramidal shape. However, as shown most clearly in FIGS. 4 and 5, the pyramidal second upright support member 134 has a much smaller footprint and height than the pyramidal first upright support member 120. While the illustrated first and second upright support members 120, 134 generally having truncated pyramidal shapes, it is to be understood that other suitable shapes may be used for first and second upright support members 120, 134 such as, for example, a rectangular shape (i.e., alternative upright support members could have a post-like appearance).

As best illustrated in FIG. 5, the first and second upright support members 120, 134 are provided with respective concave notches or pockets 130, 144 for receiving respective base portions of respective rotatable clamp subassemblies 154, 156. Referring to the assembled view of FIG. 4, it can be seen that the illustrated support assembly 112 comprises a first rotatable clamp subassembly 154 rotatably coupled to the first upright support member 120 via a clevis pin 196, which is received within a clevis pin aperture 129 (see FIG. 9). The first rotatable clamp subassembly 154 is configured to be coupled to one or more photovoltaic modules 102 (e.g., to the north side of one or more photovoltaic modules 102, as illustrated in FIG. 1). Similarly, the second rotatable clamp subassembly 156 is rotatably coupled to the second upright support member 134 via a clevis pin 196, which is received within a clevis pin aperture 143 (see FIG. 9). The second rotatable clamp subassembly 156 is configured to be coupled to one or more other photovoltaic modules 102 (e.g., to the south side of one or more photovoltaic modules 102, as illustrated in FIG. 1). In one embodiment, the clevis pins 196 are in form of self-locking implanted cotter pin (SLIC) type clevis pins that snap into place without the need for a cotter pin or other secondary retention part. Advantageously, by eliminating the use of a cotter pin, the SLIC clevis pin (or SLIC pin) saves installation time and money. Although, it is to be understood that other suitable fasteners may also be used to attach the first and second rotatable clamp subassemblies 154, 156 to their respective first and second upright support members 120 and 134. It is to be understood that different ones of the first, second, and third clamp subassemblies described hereinafter can be used together in the same support assembly 112 to accommodate various PV module mounting configurations (e.g., first clamp subassembly in notch 130 and second clamp subassembly in notch 144).

Figure 12:
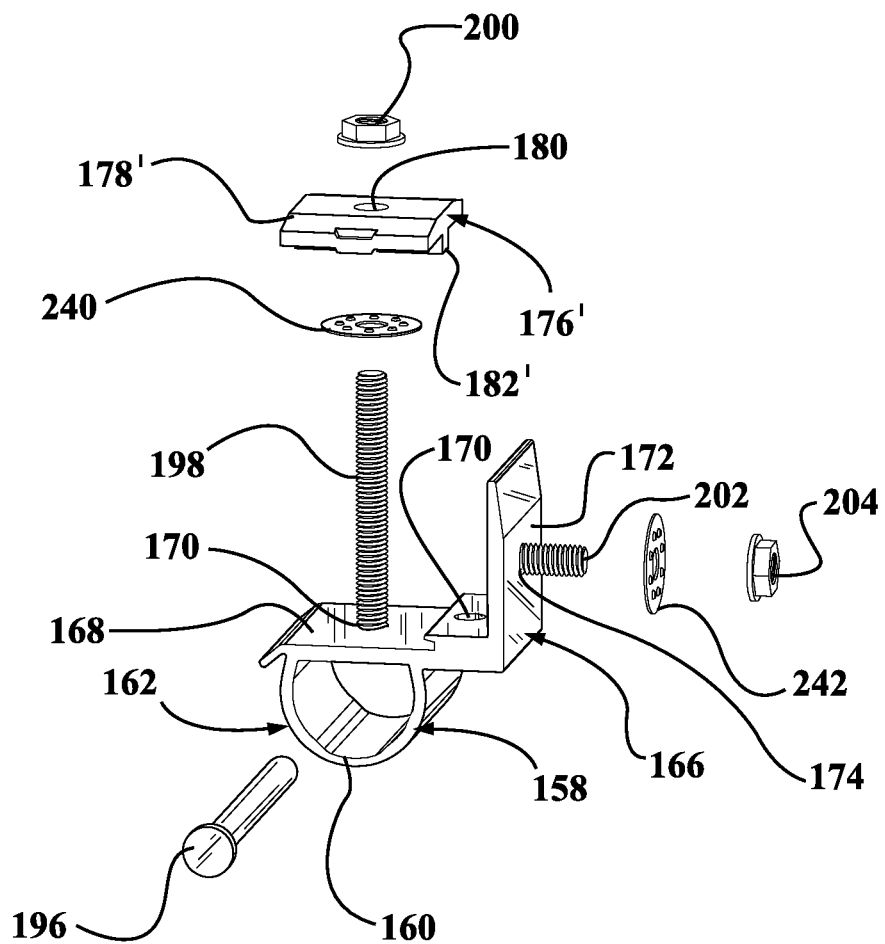
FIG. 12 is an exploded perspective view of a first type of clamp subassembly of the support assembly.

A first type of clamp subassembly (or clamp assembly) used as PV module attachment means of the support assembly 112 is illustrated in FIG. 12. As shown in the exploded view of FIG. 12, the first type of clamp subassembly generally comprises a pivotal base member 158 and an upper clamp member 176', wherein the upper clamp member 176' is coupled to the pivotal base member 158 by a fastener (e.g., headless-type assembly bolt 198 with corresponding nut 200). Referring again to FIG. 12, it can be seen that the pivotal base member 158 further includes a base portion 160 with a curved bottom surface 162, and an L-shaped flange portion 166 with a flange base portion 168 and an upright portion 172. The flange base portion 168 of the L-shaped flange portion 166 comprises fastener apertures 170 for accommodating a fastener (e.g., headless-type assembly bolt 198). In the illustrated embodiment, the fastener apertures 170 are provided with a plurality of internal threads for matingly engaging with the external threads on the bolt 198. In another embodiment, the end of the bolt 198 can be embedded in the flange base portion 168. A lock washer 240, which has a plurality of small projections or protrusions disposed thereon (e.g., semi-spherical projections), may be provided between the installed PV modules 102 and the flange base portion 168. The upright portion 172 of the L-shaped flange portion 166 also comprises a fastener aperture 174 for accommodating a fastener (e.g., headless-type bolt 202 with corresponding nut 204, which can be used for securing the top edge portion of the wind deflector 222 to the support assembly 112). Similar to the fastener aperture 170, the fastener aperture 174 of the illustrated embodiment is provided with a plurality of internal threads for matingly engaging with the external threads on the bolt 202. In another embodiment, the end of the bolt 202 can be embedded in the upright portion 172. A lock washer 242, which has a plurality of small projections or protrusions disposed thereon (e.g., semi-spherical projections), may be provided between the nut 204 and the upright portion 172, or the installed wind deflector 222 and the upright portion 172.

Still referring to FIG. 12, it can be seen that the upper clamp member 176' generally comprises a plate portion 178' with a fastener aperture 180 disposed therethrough for accommodating a fastener (e.g., headless-type assembly bolt 198 with corresponding nut 200). In the approximate middle of the plate portion 178' of the upper clamp member 176', extending from the bottom surface thereof, a longitudinally extending protrusion 182' is provided. The protrusion 182' is configured to extend into the gap between adjacent PV modules 102 when the plate portion 178' is tightened against the top surface of the PV modules 102 (e.g., by torqueing nut 200).

Figure 13:
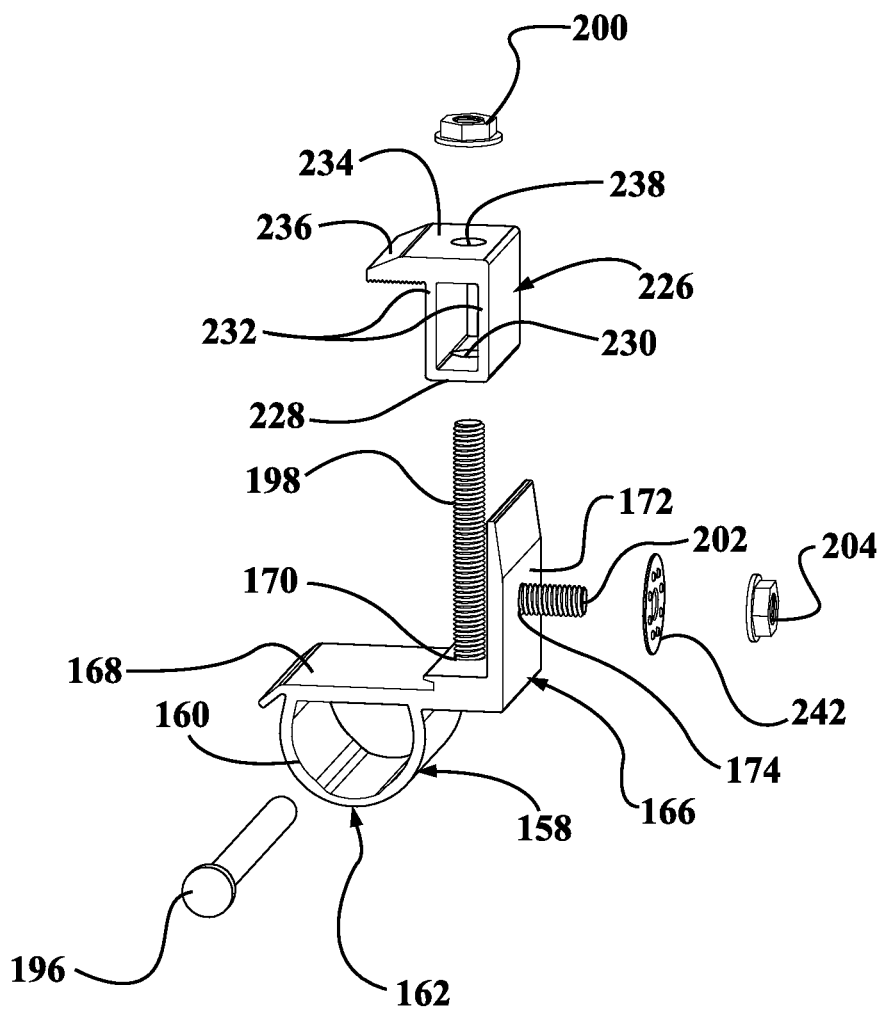
FIG. 13 is an exploded perspective view of a second type of clamp subassembly of the support assembly.
Figure 14:
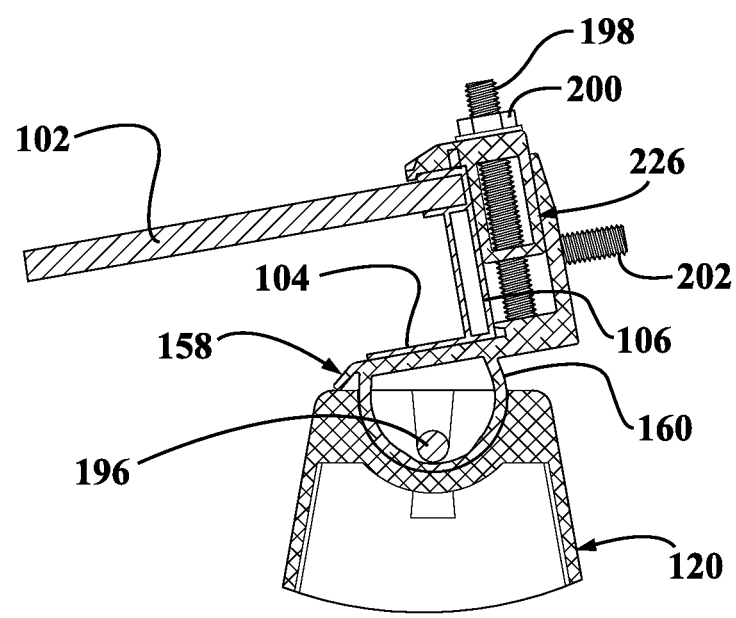
FIG. 14 is a partial sectional view illustrating the second type of clamp subassembly of the support assembly attached to a PV module, wherein the section is cut along the cutting-plane line A-A in FIG. 2.

A second type of clamp subassembly (or clamp assembly) used as PV module attachment means of the support assembly 112 is illustrated in FIGS. 13 and 14. As shown in the exploded view of FIG. 13, the second type of clamp subassembly generally comprises a pivotal base member 158 and an L-shaped side clamp member 226, wherein the L-shaped side clamp member 226 is coupled to the pivotal base member 158 by a fastener (e.g., headless-type assembly bolt 198 with corresponding nut 200). Referring again to FIG. 13, it can be seen that the structure of the pivotal base member 158 of the second type of clamp subassembly is generally the same as that described above for the first type of clamp subassembly. Although, unlike in the first clamp assembly, the headless-type assembly bolt 198 in FIG. 13 is disposed in the fastener aperture 170 disposed closest to the upright portion 172 of the L-shaped flange portion 166 of the pivotal base member 158. The components of the second clamp subassembly for attaching the top edge portion of the wind deflector 222 thereto are also generally the same as that described above for the first type of clamp subassembly. As such, no further elaboration on these components is required in conjunction with the second type of clamp subassembly.

With continued reference to FIG. 13, it can be seen that the L-shaped side clamp member 226 generally comprises a bottom wall 228, opposed side walls 232 connected to the bottom wall 228, and an upper plate portion 234 connected to the upper ends of the opposed side walls 232. The bottom wall 228 of the L-shaped side clamp member 226 comprises a fastener aperture 230 disposed therethrough for accommodating a fastener (e.g., headless-type assembly bolt 198 with corresponding nut 200). The upper plate portion 234 of the L-shaped side clamp member 226 comprises a fastener aperture 238 disposed therethrough, which is generally axially aligned with the fastener aperture 230, for accommodating a fastener (e.g., headless-type assembly bolt 198 with corresponding nut 200). As shown in FIG. 13, the upper plate portion 234 of the L-shaped side clamp member 226 also includes a chamfered edge 236.

Next, referring primarily to the sectional view of FIG. 14, the manner in which the second clamp subassembly engages one or more PV modules 102 will be described. In this figure, it can be seen that, when the L-shaped side clamp member 226 is tightened against the upper surface of the PV module 102 (e.g., by torqueing nut 200), the bottom flange 104 of the PV module 102 abuts the upper surface of base portion 160 of the pivotal base member 158, and the side flange 106 of the PV module 102 abuts the inner side wall 232 of the L-shaped side clamp member 226. As such, the one or more PV modules 102 are clamped into place on the support assembly 112.

Figure 15:
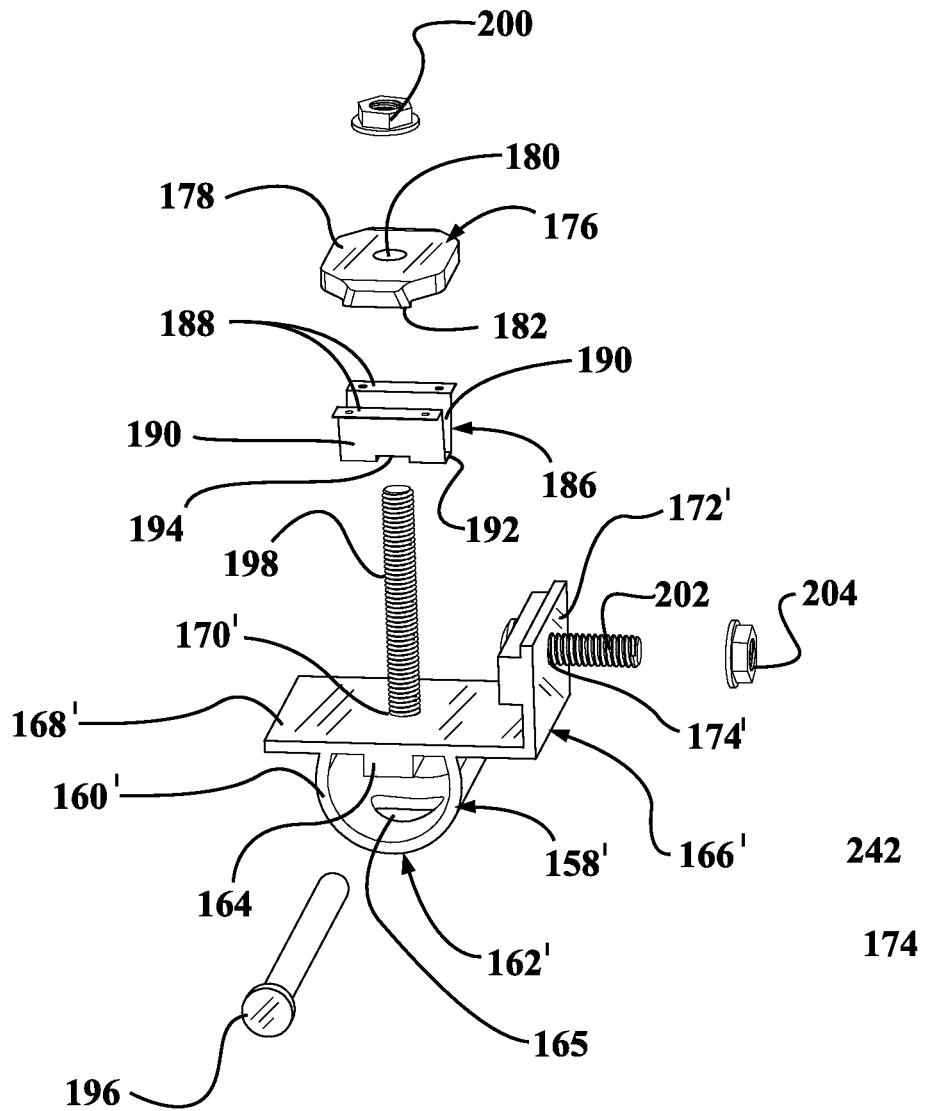
FIG. 15 is an exploded perspective view of a third type of clamp subassembly of the support assembly.
Figure 16:
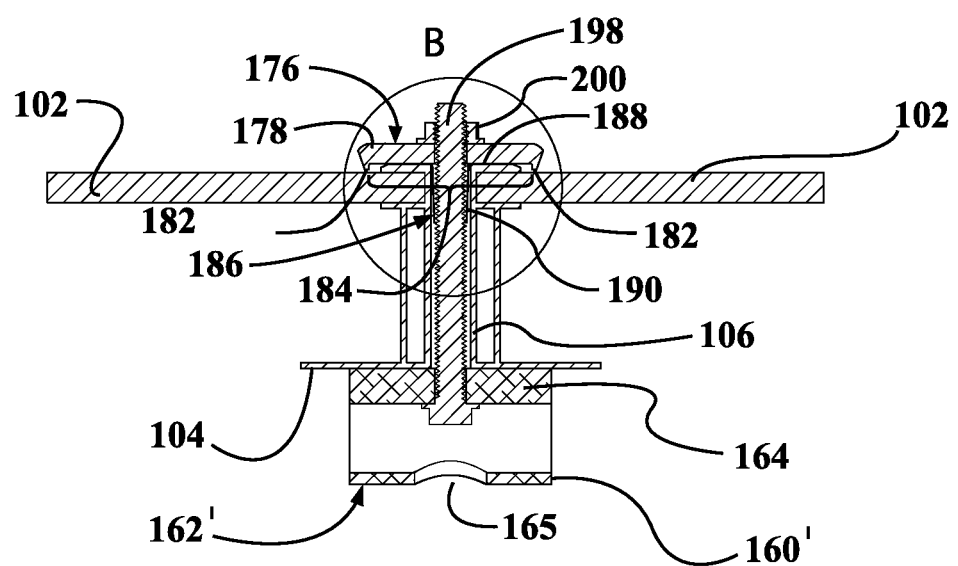
FIG. 16 is a partial sectional view of the third type of clamp subassembly of the support assembly, wherein the section is cut along the cutting-plane line B-B in FIG. 17.
Figure 17:
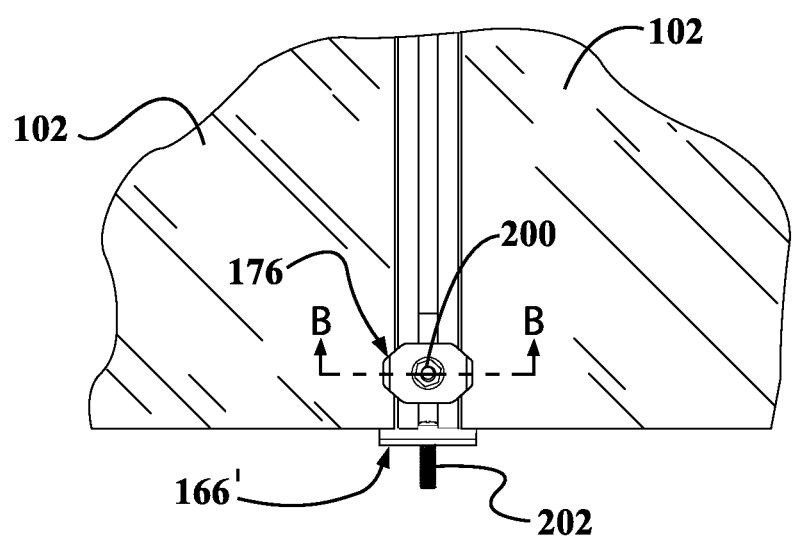
FIG. 17 is a partial top plan view of adjacent PV modules supported using the third type of clamp subassembly of the support assembly.
Figure 20:
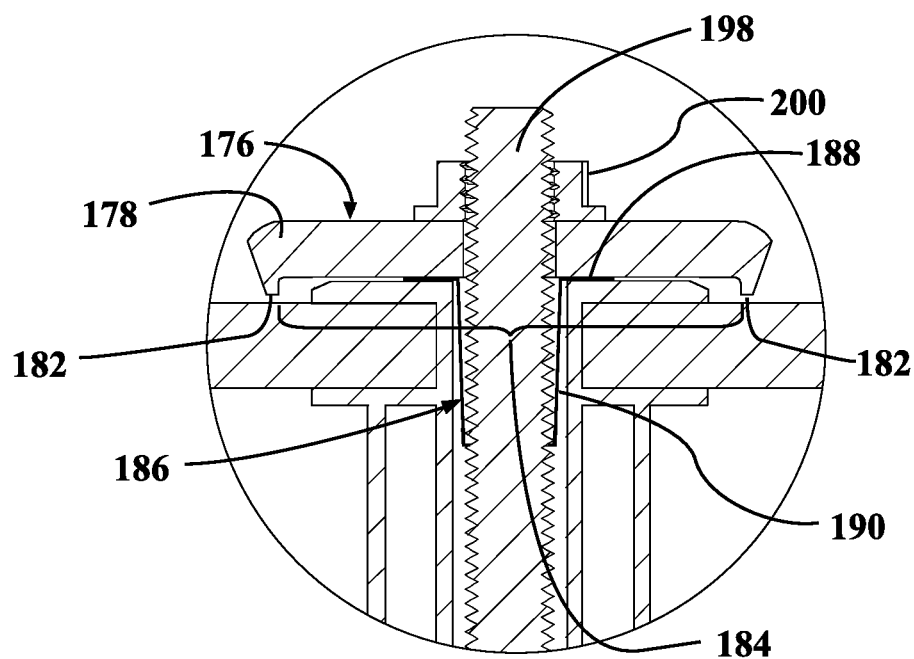
FIG. 20 is an enlarged partial sectional view of an encircled portion of FIG. 16 (Detail B), showing a bonding clamp member of the clamp subassembly of FIG. 16 in more detail.

A third type of clamp subassembly (or clamp assembly) used as PV module attachment means of the support assembly 112 is illustrated in FIGS. 15-17. Initially, as shown in the exploded view of FIG. 15, the third type of clamp subassembly generally comprises a pivotal base member 158', an upper clamp member 176 coupled to the pivotal base member 158' by a fastener (e.g., headless-type assembly bolt 198 with corresponding nut 200), and a bonding clamp member 186 coupled to the upper clamp member 176 and the pivotal base member 158' by the fastener (e.g., 198, 200), wherein a portion of the bonding clamp member 186 is configured to be disposed between two PV modules 102 (refer to the sectional views of FIGS. 16 and 20). Referring again to FIG. 15, it can be seen that the pivotal base member 158' further includes a base portion 160' with a curved bottom surface 162', and an L-shaped flange portion 166' with a flange base portion 168' and an upright portion 172'. The base portion 160' of the pivotal base member 158' comprises a generally downwardly extending protrusion 164 transversely disposed thereacross, and an aperture 165 disposed through the curved bottom surface 162' thereof. The flange base portion 168' of the L-shaped flange portion 166' comprises a fastener aperture 170' for accommodating a fastener (e.g., headless-type assembly bolt 198). In the illustrated embodiment, the fastener aperture 170' is provided with a plurality of internal threads for matingly engaging with the external threads on the bolt 198. In another embodiment, the end of the bolt 198 can be embedded in the flange base portion 168'. The upright portion 172' of the L-shaped flange portion 166' also comprises a fastener aperture 174' for accommodating a fastener (e.g., headless-type bolt 202 with corresponding nut 204, which can be used for securing the top edge portion of the wind deflector 222 to the support assembly 112). Similar to the fastener aperture 170', the fastener aperture 174' of the illustrated embodiment is provided with a plurality of internal threads for matingly engaging with the external threads on the bolt 202. In another embodiment, the end of the bolt 202 can be embedded in the upright portion 172'.

Still referring to FIG. 15, it can be seen that the upper clamp member 176 generally comprises a plate portion 178 with a fastener aperture 180 disposed therethrough for accommodating a fastener (e.g., headless-type assembly bolt 198 with corresponding nut 200). The upper clamp member 176 further comprises spaced apart protrusions 182 (see FIG. 16) extending from a lower surface thereof, wherein a gap 184 is formed between the spaced apart protrusions 182 of the upper clamp member 176, and wherein the spaced apart protrusions 182 are configured to prevent the one or more PV modules 102 from becoming disengaged from the upper clamp member 176, and the gap 184 between the spaced apart protrusions 182 is configured to accommodate thermal expansion and contraction of the one or more photovoltaic modules 102. As shown in FIG. 16, the spaced apart protrusions 182 are disposed on opposite sides of PV module flanges when the upper clamp member 176 is tightened against the top surface of the PV modules 102 (e.g., by torqueing nut 200). Thus, the upper clamp member 176 is in the form of a compression clamp (i.e., it is compressed against the top surfaces of the PV modules 102 by the tightening of the nut 200). In some embodiments, the flange base portions 168, 168' may include spaced apart protrusions, similar to the spaced apart protrusions 182 of the upper clamp member 176.

In one or more embodiments, the upper clamp member 176 and the bonding clamp member 186 of the third clamp subassembly each comprises a conductive material so as to provide integrated grounding for the one or more PV modules 102. For example, the upper clamp member 176 and the bonding clamp member 186 may individually, together, or in cooperation with other components of the support assembly 112, form a grounding current path between adjacent PV modules 102. In particular, the upper clamp member 176 may be formed of stainless steel for strength and to be conductive with the bonding clamp member 186. As explained above, the spaced apart protrusions 182 disposed on the lower/outer edges prevent the PV modules 102 from sliding out and becoming unattached from the upper clamp member 176 of the support assembly 112. The gap 184 between the spaced apart protrusions 182 allows for thermal movements. While the illustrated bonding clamp member 186 comprises one form of a bonding method that may be practiced in accordance with the principles of the invention, it is to be understood that other components of the support assembly 112 may provide integrated grounding for the PV modules 102 as well, such as other components of the clamp subassemblies (e.g., in some embodiments, all components of the clamp subassemblies may be conductive for grounding purposes). Advantageously, the support assembly 112 described herein comprises one or more components, such as the pivotal base member 158, 158', the upper clamp members 176, 176', the bonding clamp member 186, and the L-shaped side clamp member 226, that integrates grounding from one PV module 102 to the next. The upper clamp member 176 and the bonding clamp member 186 are exemplary types of suitable compression grounds that may be utilized in the support assemblies 112 described herein. When the upper clamp member 176 is compressed by the tightening of the nut 200, the protrusions (or spikes) 182 on the upper clamp member 176 are designed to penetrate the non-conductive, anodized layers of the PV modules 102 so as to provide a ground current path (or a current path to ground).

With reference to FIGS. 15 and 16, it can be seen that the bonding clamp member 186 of the third clamp subassembly generally comprises a bottom wall 192, opposed tapered side walls 190 connected to the bottom wall 192, and opposed flange portions 188 connected to the upper ends of the tapered side walls 190. The bottom wall 192 of the bonding clamp member 186 comprises a fastener aperture 194 disposed therethrough for accommodating a fastener (e.g., headless-type assembly bolt 198 with corresponding nut 200). Advantageously, the bonding clamp member 186 has a structural configuration and a material composition that enables the bonding clamp member 186 to accommodate thermal expansion and contraction of one or more PV modules 102. In particular, the bonding clamp member 186 only has protrusions downward into each PV module 102, whereas the top is smooth. This allows for thermal expansion and contraction. The sliding of the bonding clamp member 186 is possible because the upper clamp member 176 is preferably made of stainless steel, and not aluminum which requires the piercing of the anodization layer of the PV module 102. Aluminum has a non-conductive layer, while steel is very conductive.

Also, as best shown in the sectional view of FIG. 16, the bottom wall 192 and opposed side wall portions 190 of the bonding clamp member 186 are configured to drop down between the side flanges 106 of adjacent PV modules 102 so as to provide integrated grounding for the PV modules 102 (i.e., the metallic, electrically conductive bonding clamp member 186 helps to establish a current path between PV modules 102 so that conventional grounding, such as a network of copper wire, is not required). Thus, the bonding clamp member 186 reduces material and installation costs associated with the installation of a photovoltaic system or array 100.

In one alternative embodiment, rather than using the headless-type assembly bolt 198 with corresponding nut 200 in the clamp subassemblies described above, a serrated flange hex bolt may be used to hold the components of the clamp assemblies together. Advantageously, serrated flange hex bolt has a simple configuration and locks into place. Preferably, both the headless-type assembly bolt 198 described above, and the alternative serrated flange hex bolt would be made of a conductive material so as to provide conductivity between the upper clamp members 176, 176' and the pivotal base member 158, 158'.

Advantageously, the pivotal base members 158, 158' of the clamp subassemblies described above swivel or rotate in the concave notches or pockets 130, 144 of the upright support members 120, 134 of the support assembly 112 so as to accommodate a plurality of different tilt angles of one or more PV modules 102, as determined by the sizes of the PV modules 102 and orientation that they are installed (e.g., accommodating PV module tilt angles ranging from approximately four (4) degrees to approximately twelve (12) degrees, inclusive; or ranging between four (4) degrees and twelve (12) degrees, inclusive). During the installation process, the pivotal base members 158, 158' of the clamp subassemblies are simply rotated about their respective clevis pins 129, 134 until the desired PV module tilt angle is achieved.

Figure 18:
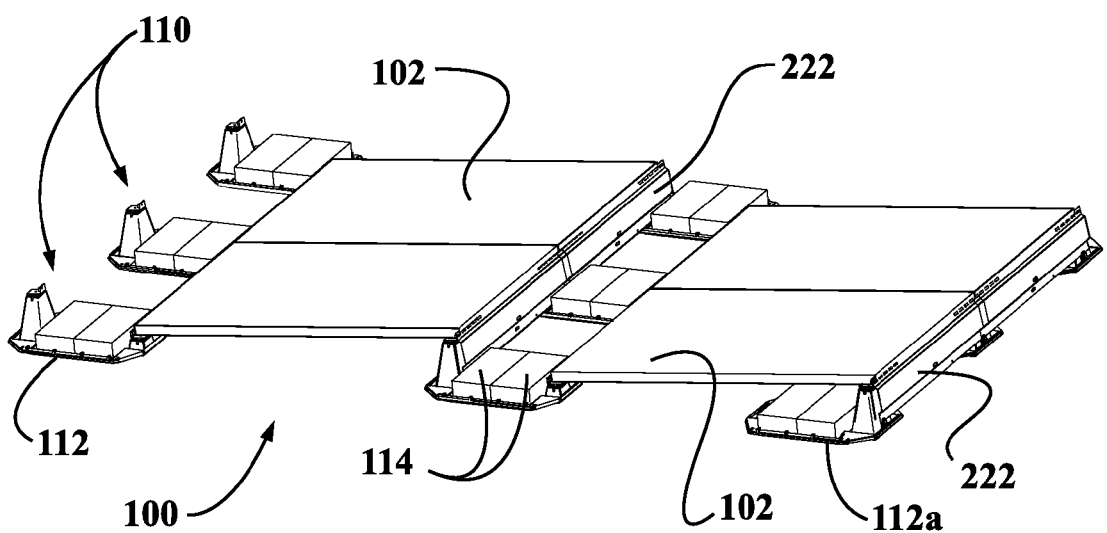
FIG. 18 is yet another perspective view of the alternative version of the array of PV modules shown in FIG. 11 but wherein the northernmost support assemblies are tucked under the northernmost row of PV modules.

In addition, the clamp subassemblies described above are preferably detachably coupled to the first upright support member 120 and/or the second upright support member 134 by a removable pin member (e.g., a removable clevis pin 196) such that the upright portion 172, 172' of the L-shaped flange portions 166, 166' are capable of being disposed near a selected one of opposite sides of one of the first upright support member 120 and the second upright support member 134 (e.g., near either front wall 122 or rear wall 126 of first upright support member 120; or near either front wall 136 or rear wall 140 of second upright support member 134). Advantageously, the removable nature of the clamp subassemblies allows selected ones of the support assemblies 112a to be installed "backwards" on the north row of the PV system or array 100 (refer to FIG. 18, the direction of the northernmost support assemblies 112a are flipped relative to the other support assemblies 112). This permits the northernmost support assemblies 112a to be tucked under the PV modules 102 in the north row to reduce the footprint of the PV array 100, and to enable more PV modules 102 to fit on a rooftop, while also decreasing the wind drag of the system 100.

In one or more embodiments, all of the clamping components (e.g., pivotal base members 158, 158', upper clamp members 176, 176', bonding clamp member 186, bolt 198, nut 200, L-shaped side clamp member 226) described in conjunction with first, second, and third clamp subassemblies are formed from metal so as to enable the clamp components to be both electrically conductive and structurally rigid.

Now, other illustrated features of the base portion 116 of the support assembly 112 will be described. Initially, with reference to FIGS. 4, 5, and 7-9, it can be seen that the base portion 116 comprises integral wire clips 148 for accommodating one or more wires of one or more photovoltaic (PV) modules 102. Advantageously, the wire clips 148 are integrally formed in the base portion 116 (e.g., integrally molded into the plastic of the base portion 116). The integral wire clips 148 are particularly designed for accommodating PV module wires that are running in the north/south direction. As shown in FIGS. 4 and 5, the wire clips 148 are longitudinally spaced apart along the length of the base portion 116 (i.e., from front-to-back). Also, as illustrated in these figures, successive wire clips 148 are arranged in opposite directions (i.e., the wire clips 148 open in opposite directions) so as to securely hold the PV module wires in place. Each wire clip 148 on each side of the base portion 116 is designed to hold two (2) PV module wires, which is enough for connecting PV source circuits. Advantageously, the integral wire clips 148 obviate the need for separate wire clips, thereby reducing both part and labor costs for a PV array installation.

Figure 7:
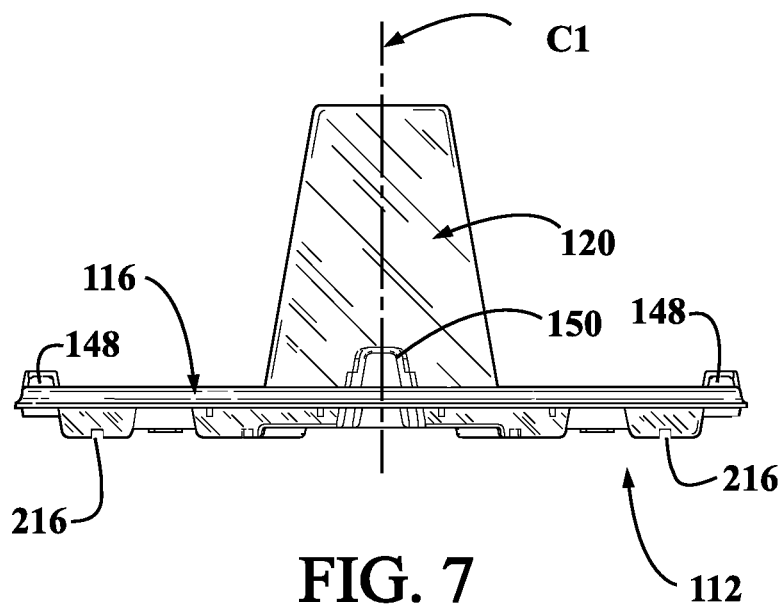
FIG. 7 is a front elevation view of the body portion of the support assembly of FIG. 5.
Figure 9:
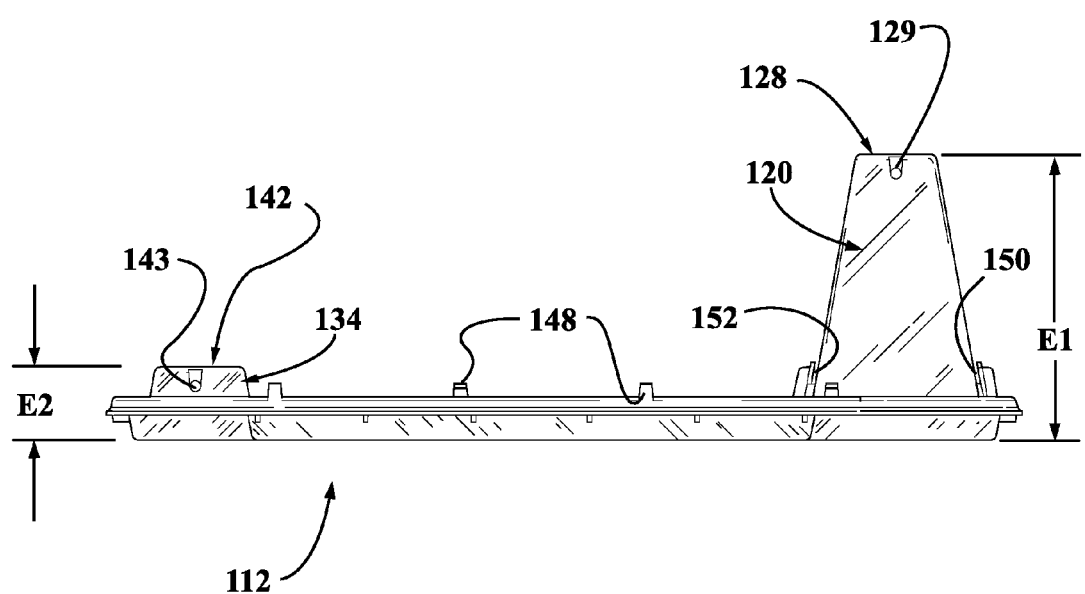
FIG. 9 is a side elevation view of the body portion of the support assembly of FIG. 5.
Figure 10:
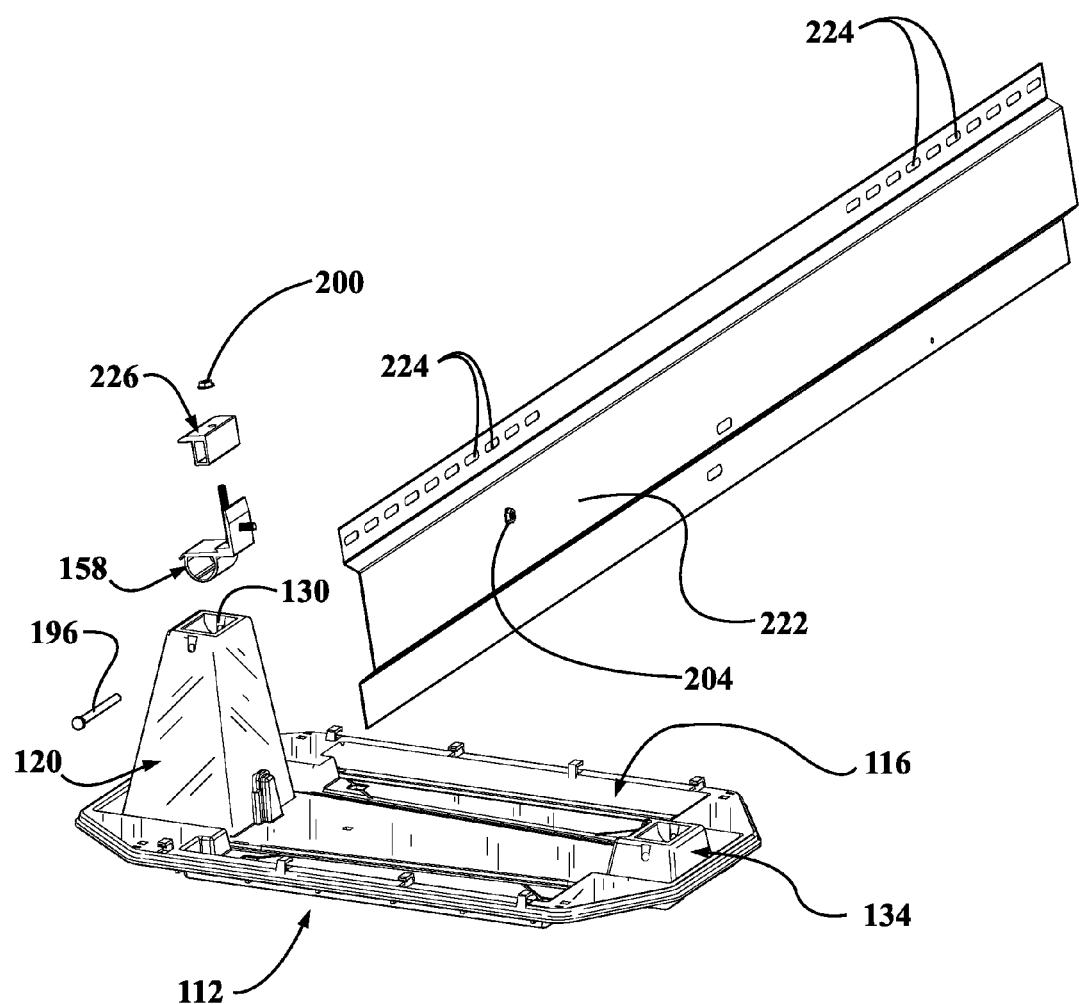
FIG. 10 is an exploded perspective view of one of the support assemblies of FIGS. 1-3 and a wind deflector.

As depicted in FIGS. 5, 7, and 9, the illustrated first upright support member 120 comprises an integrally formed slot 150 in the front wall 122 thereof for receiving an edge of a wind deflector or wind shield (e.g., wind deflector 222 in FIG. 10). Similarly, the opposite, rear wall 126 of the first upright support member 120 also comprises an integrally formed slot 152 formed therein for receiving an edge of a wind deflector (e.g., wind deflector 222). Advantageously, the integrally formed slots 150, 152 enable the edge of a wind deflector 222 to be coupled to the support assembly 112 without a fastener. Because a fastener is only needed at the top of the wind deflector 222, and not at the bottom thereof, the integrally formed slots 150, 152 of the support assembly 112 reduce the requisite number of wind deflector securement fasteners in half, thereby saving material costs and installation labor. Additional details of the wind deflector configuration will be discussed hereinafter.

Figure 6:
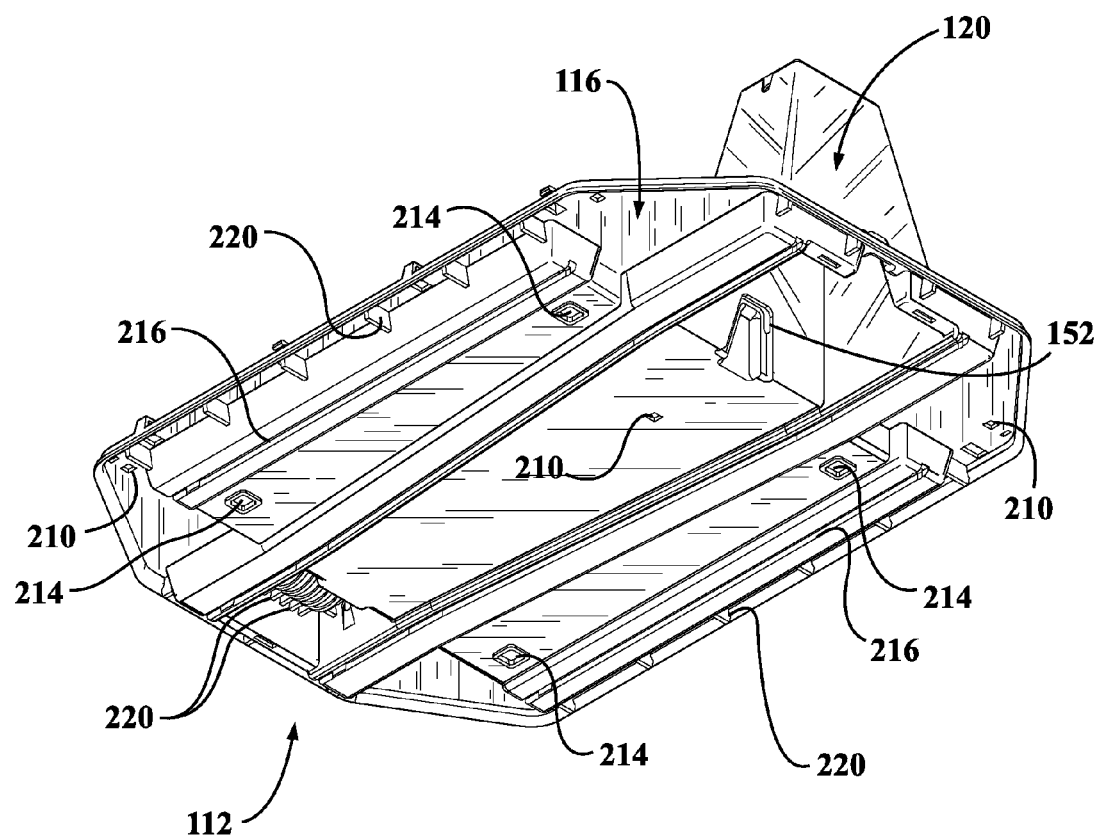
FIG. 6 is a bottom perspective view of the body portion of the support assembly of FIG. 5.
Figure 19:
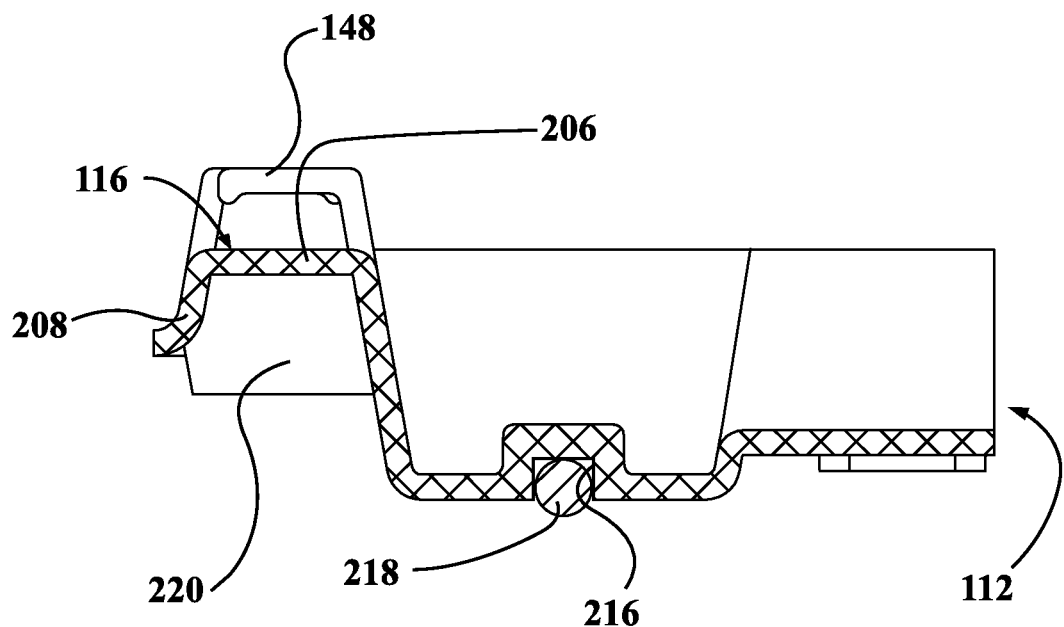
FIG. 19 is a partial sectional view of the base portion of the support assembly illustrating a gasket on the bottom of the base portion, wherein the section is cut along the cutting-plane line C-C in FIG. 4.

In addition, with reference to FIGS. 4, 6, and 19, the illustrated base portion 116 of the support assembly 112 comprises a bottom surface with one or more grooves 216 (see FIGS. 6 and 19) for accommodating one or more respective gaskets or pieces of cord stock 218 (see FIG. 19). In one embodiment, the cord stock may comprise ethylene-propylene-diene monomer (EDPM) cord stock (i.e., EDPM O-rings). Advantageously, the use of the gaskets or pieces of cord stock 218 in the grooves 216 of the base portion 116 increases the grip of the support assembly 112 on the rooftop support surface 108, and it protects the membrane of the rooftop support surface 108 from potential tears. As such, the bottom of the base portion 116 of the support assembly 112 is roof-friendly because it is designed to prevent the roof membrane from being damaged or punctured. In order to further protect the integrity of the roofing membrane, it can be seen in FIGS. 6 and 19 that the bottom of the base portion 116 of the support assembly 112 is generally provided with all rounded surfaces at corners so as to ensure that there are no sharp edges or corners that could tear the roof. The gaskets or pieces of cord stock 218 are low cost and can be installed at the factory, thereby obviating the need for the on-site installation thereof. Also, advantageously the friction fit of the gaskets or pieces of cord stock 218 against the rooftop support surface 108 allows the support assembly 112 to be easily removed at the end of its life cycle for recycling purposes.

Referring to FIGS. 4-6, it can be seen that the illustrated base portion 116 of the support assembly 112 is provided with a plurality of drainage channels 212 and a plurality of weep holes 214 for draining water from the base portion 116. Thus, rain water and other melting precipitation will not collect in the tray-like base portion 116 of the support assembly 112 (i.e., the precipitation will not excessively pool in the recessed portion 118 of the base portion 116). As shown in FIGS. 4 and 5, the drainage channels 212 are generally connected to diagonally opposite corners of each generally square-shaped weep hole 214. However, it is to be understood that other suitable geometries may be used for the weep holes 214 (e.g., circular) and the other suitable configurations can be used for the drainage channels 212.

Figure 8:
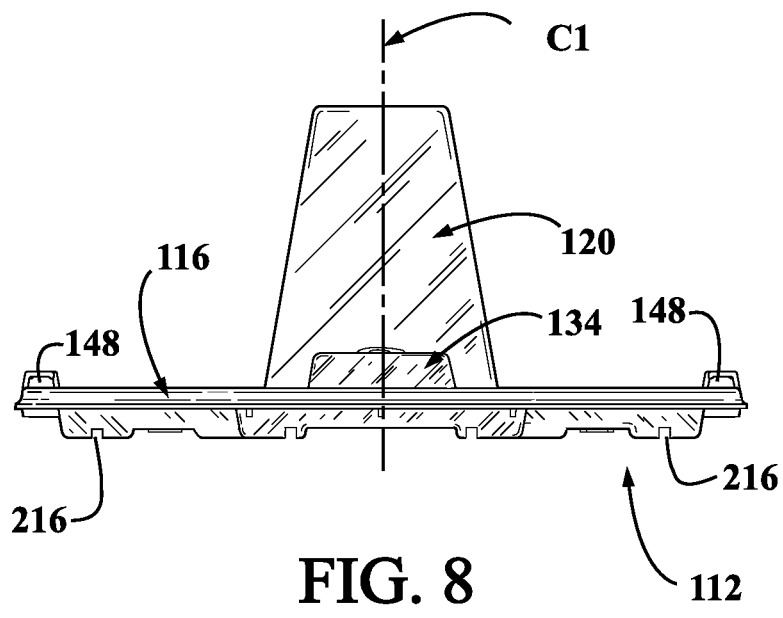
FIG. 8 is a rear elevation view of the body portion of the support assembly of FIG. 5.

As shown in the front and rear views of FIGS. 7 and 8, many of the features of the base portion 116 of the support assembly 112 described above are symmetrically arranged with respect to a centerline C1 disposed in the middle of a transverse profile of the support assembly 112. For example, the wire clips 148 illustrated in FIGS. 7 and 8 are symmetrically arranged with respect to the centerline C1.

While the support assemblies 112 are generally not required to be attached to the rooftop support surface 108 in most installations, nonetheless, the base portion 116 of the illustrated support assembly 112 is provided with a plurality of attachment points 210 (e.g., in the form of square-shaped apertures disposed therethrough—see FIGS. 4-6) for accommodating high wind or seismic installation areas, or for accommodating wireways. In such installations, a lag bolt can be inserted from the bottom, and through one of the attachment points 210. Advantageously, the large bearing surface of the lag bolt is used to prevent spinning while torqueing. An L-shaped bracket, which is commonly used in PV installations, can be tightened onto the top of the part. Custom brackets may also be used.

The illustrated embodiment also includes rear wind shields or wind deflectors 222 supported by the support assemblies 112 at the rear side of the illustrated PV module rows in order to reduce wind load (see e.g., FIGS. 1, 2, 11, and 18). The illustrated wind deflectors 222 are held by the first upright support members 120 of the support assemblies 112 and are shaped to deflect wind, blowing from the north, up and over the array of PV modules 102 rather than under the PV modules 102 in order to reduce wind load. Referring to the assembled view of FIG. 2 and the exploded view of FIG. 10, it can be seen that the illustrated upper flange of the wind deflector 222 is provided with a plurality of elongated apertures 224 for receiving fasteners (e.g., headless-type bolts 202 described above) which secure the upper flange (upper edge portion) of the wind deflector 222 to the support assemblies 112. The elongated apertures 224 in the upper flange (upper edge portion) of the wind deflector 222 accommodate various PV module or panel widths 102 and accommodate for thermal expansion of the wind deflector 222. Advantageously, as described above, the lower flange (lower edge portion) of the wind deflector 222 is not required to contain any apertures for its securement to the support assemblies 112 because the lower flange (lower edge portion) of the wind deflector 222 merely slips into the wind deflector slot 152 in the rear wall 126 of the first upright support member 120, or alternatively, into the wind deflector slot 150 in the front wall 122 of the first upright support member 120. While the wind deflector 222 is not required in all installations of the PV system 100, it is beneficial for reducing the wind forces exerted on the PV modules 102 and it allows the PV system 100 to be installed in more severe wind areas.

Any of the features or attributes of the above described embodiments and variations can be used in combination with any of the other features and attributes of the above described embodiments and variations as desired.

From the foregoing disclosure it will be apparent that the mounting systems according to the present invention, which comprise a plurality of support assemblies, provide improved means for mounting PV modules to flat rooftops and the like. These attributes provide the mounting system with important advantages over competitive products on the market today. These advantages include: it is environmentally friendly, universal and off-the shelf design, no electrical grounding is required, rustproof, and no harm to the roof membrane because it does not penetrate the roof in any way.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

The invention claimed is:

1. A support assembly for supporting one or more photovoltaic modules on a support surface, said support assembly comprising:

a body portion, said body portion including a base portion for accommodating one or more ballasts, said body portion further including at least one hollow support member coupled to said base portion, said body portion comprising polymer; and integrated grounding means, said integrated grounding means configured to provide integrated grounding between adjacent photovoltaic modules;

wherein said support assembly is configured to bridge multiple rows of photovoltaic modules without being directly secured to any other said support assembly, said support assembly configured to be structurally connected to another support assembly only by means of one or more of the photovoltaic modules.

2. The support assembly according to claim 1, wherein said base portion comprises integral wire clips for accommodating one or more wires of said one or more photovoltaic modules.

3. The support assembly according to claim 1, wherein said at least one hollow support member comprises an integrally formed slot in one side thereof for receiving an edge of a wind deflector, so as to enable said edge of said wind deflector to be coupled to said support assembly without a fastener.

4. The support assembly according to claim 1, further comprising at least one clamp subassembly, said at least one clamp subassembly coupled to said body portion, said at least one clamp subassembly configured to be coupled to one or more photovoltaic modules.

5. The support assembly according to claim 4, wherein said at least one clamp subassembly is rotatably coupled to said body portion of said support assembly, said at least one clamp subassembly configured to accommodate a plurality of different tilt angles of said one or more photovoltaic modules.

6. The support assembly according to claim 5, wherein said at least one clamp subassembly comprises a pivotal base member with a curved bottom surface.

7. The support assembly according to claim 4, wherein said at least one clamp subassembly comprises a base member and an upper clamp member coupled to said base member by a fastener.

8. The support assembly according to claim 7, wherein said at least one clamp subassembly further comprises a bonding clamp member, wherein a portion of said bonding clamp member is configured to accept one or more photovoltaic modules so as to form at least a portion of said integrated grounding means.

9. The support assembly according to claim 8, wherein said bonding clamp member has a structural configuration and a material composition that enables said bonding clamp member to accommodate thermal expansion and contraction of said one or more photovoltaic modules.

10. The support assembly according to claim 7, wherein said upper clamp member comprises spaced apart protrusions extending from a lower surface thereof, wherein a gap is formed between said spaced apart protrusions of said upper clamp member, and wherein said spaced apart protrusions are configured to prevent said one or more photovoltaic modules from becoming disengaged from said upper clamp member, and said gap between said spaced apart protrusions is configured to accommodate thermal expansion and contraction of said one or more photovoltaic modules.

11. The support assembly according to claim 1, further comprising at least one clamp subassembly, wherein said at least one clamp subassembly comprises an L-shaped flange portion, said L-shaped flange portion comprising a flange base portion and an upright portion attached to said flange base portion, said upright portion of said L-shaped flange portion comprising an aperture for receiving a fastener for securing one edge of a wind deflector to said support assembly.

12. The support assembly according to claim 1, wherein said support assembly is structurally configured to accommodate photovoltaic modules in both a portrait orientation and a landscape orientation.

13. A support assembly for supporting one or more photovoltaic modules on a support surface, said support assembly comprising:
   a body portion, said body portion including a base portion for accommodating one or more ballasts, said body portion further including at least one hollow support member coupled to said base portion, said body portion comprising polymer;
   integrated grounding means, said integrated grounding means configured to provide integrated grounding between adjacent photovoltaic modules; and
   at least one clamp subassembly, said at least one clamp subassembly coupled to said body portion, said at least one clamp subassembly configured to be coupled to one or more photovoltaic modules and to a wind deflector;
   wherein said support assembly is configured to bridge multiple rows of photovoltaic modules without being directly secured to any other said support assembly, said support assembly configured to be structurally connected to another support assembly only by means of one or more of the photovoltaic modules.

14. The support assembly according to claim 13, wherein said at least one clamp subassembly comprises an L-shaped flange portion, said L-shaped flange portion comprising a flange base portion and an upright portion attached to said flange base portion.

15. The support assembly according to claim 14, wherein said at least one clamp subassembly is detachably coupled to said body portion by a removable pin member such that said upright portion of said L-shaped flange portion is capable of being disposed near a selected one of opposite sides of a component of said body portion.

16. The support assembly according to claim 13, wherein said base portion comprises a bottom surface with one or more grooves for accommodating one or more respective gaskets or pieces of cord stock.

17. The support assembly according to claim 13, wherein said base portion comprises one or drainage channels and one or more weep holes for draining water from said base portion.

18. The support assembly according to claim 13, wherein said support assembly is in the form of a non-penetrating support device that does not penetrate the support surface.

19. A mounting system for supporting a plurality of photovoltaic modules on a support surface, said mounting system comprising:
   a plurality of photovoltaic modules disposed in an array, said array including a plurality of rows of said photovoltaic modules; and
   a plurality of separate support assemblies supporting and orienting said photovoltaic modules in said array, each of said plurality of support assemblies comprising:
      a body portion, said body portion including a base portion for accommodating one or more ballasts, said body portion further including at least one hollow support member coupled to said base portion, said body portion comprising polymer; and
      integrated grounding means, said integrated grounding means configured to provide integrated grounding between adjacent photovoltaic modules;
   wherein one or more of said plurality of support assemblies are configured to bridge two of said plurality of rows of said photovoltaic modules without being directly secured to any other of said plurality of support assemblies, each of said one or more of said plurality of support assemblies only being structurally connected to any other of said plurality of support assemblies by means of one or more of the photovoltaic modules in the array.

20. The mounting system according to claim 19, wherein each of said plurality of support assemblies further comprises at least one clamp subassembly, said at least one clamp subassembly coupled to a respective said body portion of a respective said support assembly, said at least one clamp subassembly configured to be coupled to one or more photovoltaic modules.

21. The support assembly according to claim 20, wherein said at least one clamp subassembly comprises one or more components formed from a conductive material, said one or more components forming said integrated grounding means.

* * * * *